United States Patent
Kuo et al.

(10) Patent No.: US 10,141,836 B1
(45) Date of Patent: Nov. 27, 2018

(54) CONTROL CIRCUIT CAPABLE OF DETECTING STATUS OF RECEIVING POWER AND DECREASING VOLTAGE OF CAPACITOR ACCORDINGLY

(71) Applicant: WELTREND SEMICONDUCTOR INC., Hsinchu (TW)

(72) Inventors: Ming-Ying Kuo, Hsinchu (TW); Yi-Lun Shen, Hsinchu (TW); Ren-Yi Chen, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 0 days.

(21) Appl. No.: 15/981,905

(22) Filed: May 17, 2018

(30) Foreign Application Priority Data

May 22, 2017 (TW) .............................. 106116851 A (51) Int. Cl.
*H02M 1/32* (2007.01)
*H02M 1/12* (2006.01)
*H02M 1/36* (2007.01)

(52) U.S. Cl.
CPC ............. *H02M 1/32* (2013.01); *H02M 1/126* (2013.01); *H02M 1/36* (2013.01); *H02M 2001/322* (2013.01)

(58) Field of Classification Search
CPC .......... H02M 1/32; H02M 1/36; H02M 1/126; H02M 2001/322
See application file for complete search history.

(56) References Cited

U.S. PATENT DOCUMENTS

| 8,508,960 | B2* | 8/2013 | Chen | .................... | H02H 1/0007 |
| | | | | | 361/58 |
| 9,664,714 | B2* | 5/2017 | Chen | .................. | G01R 19/0007 |
| 2011/0176341 | A1 | 7/2011 | Huang | | |
| 2016/0276853 | A1* | 9/2016 | Meng | ....................... | H02M 1/32 |
| 2018/0198363 | A1* | 7/2018 | Watanabe | ................. | H02J 1/00 |

FOREIGN PATENT DOCUMENTS

| TW | 201138253 A1 | 11/2011 |
| TW | 201138302 A1 | 11/2011 |
| TW | 201338387 A | 9/2013 |
| TW | M471101 U | 1/2014 |

* cited by examiner

*Primary Examiner* — Kyle J Moody
(74) *Attorney, Agent, or Firm* — Winston Hsu (57) ABSTRACT

A control circuit includes a set of alternating-current (AC) power receiver terminals, a rectification unit, a transistor, a switch, a detection unit, a comparison unit and a logic control circuit. The AC power receiver terminals receive and send external AC power to the rectification unit. The rectification unit outputs an operation voltage accordingly. The transistor is coupled between the rectification unit and the switch. The detection unit is coupled to the rectification unit to generate a first detection voltage and a second detection voltage according to the operation voltage. When the first detection signal is equal to the second detection signal, the comparison unit sends a comparison signal. The logic control circuit turns on the transistor and the switch if the comparison signal still has not been received after a predetermined time interval has elapsed.

10 Claims, 10 Drawing Sheets

CONTROL CIRCUIT CAPABLE OF DETECTING STATUS OF RECEIVING POWER AND DECREASING VOLTAGE OF CAPACITOR ACCORDINGLY

BACKGROUND OF THE INVENTION

1. Field of the Invention

The invention relates to a control circuit, and more particularly, a control circuit being capable of detecting status of receiving power and decreasing a voltage of a capacitor accordingly.

2. Description of the Prior Art

In current applications, an alternating-current (AC) power source is a commonly used power source. For example, a main power socket is a conventional power source. In a circuit structure of a receiving terminal for receiving alternating-current power, an electromagnetic interference (EMI) filter can be installed to filter out noise. An EMI filter may include a capacitor, and a large amount of electrical charges may accumulate in the capacitor so as to cause a high voltage. When a receiving terminal is removed away from an alternating-current power source (e.g. pulling a plug away from a socket), the capacitor should be discharged to decrease the high voltage to protect a user from electric shocks. Presently, there are relevant safety regulations for regulating the engineering specifications of discharging a capacitor and decreasing voltage. For example, the voltage should be decreased to a safety value within 1 second.

In the present circuit structure, a resistor is often used and coupled to the EMI filter to form a path for discharging the capacitor of the EMI filter. The circuit structure can decrease the high voltage, but the resistor will keep consuming power when the alternating-current power source is supplying power. Hence, a problem of excessive power consumption occurs when using the conventional circuit structure.

SUMMARY OF THE INVENTION

An embodiment provides a control circuit including a set of alternating-current power receiver terminals, a rectification unit, a transistor, a switch, a detection unit, a comparison circuit and a logic control circuit. The set of alternating-current power receiver terminals are used to receive external alternating-current power. The rectification unit includes a first terminal, a second terminal and an intermediary terminal where the first terminal and the second terminal of the rectification unit are coupled to the set of alternating-current power receiver terminals, and the intermediary terminal is used to output an operation voltage corresponding to the external alternating-current power. The transistor includes a first terminal coupled to the intermediary terminal of the rectification unit, a control terminal, and a second terminal. The switch includes a first terminal coupled to the second terminal of the transistor, a control terminal, and a second terminal coupled to a low voltage terminal. The detection unit is used to generate a first detection voltage and a second detection voltage according to the operation voltage, and includes an input terminal coupled to the intermediary terminal of the rectification unit, a first output terminal used to output the first detection voltage, and a second output terminal used to output the second detection voltage. The comparison circuit includes a first terminal coupled to the first output terminal of the detection unit, a second terminal coupled to the second output terminal of the detection unit, and an output terminal used to output a comparison signal when the first detection voltage is equal to the second detection voltage. The logic control circuit includes an input terminal coupled to the output terminal of the comparison circuit, a first output terminal coupled to the control terminal of the transistor, and a second output terminal coupled to the control terminal of the switch where the logic control circuit turns on the transistor and the switch through the first output terminal and the second output terminal of the logic control circuit when the input terminal of the logic control circuit still has not received the comparison signal after a predetermined time interval has elapsed.

Another embodiment provides a control method for controlling a circuit. The circuit includes a set of alternating-current power receiver terminals, a rectification unit coupled to the set of alternating-current power receiver terminals, a transistor coupled an intermediary terminal of the rectification unit, a switch coupled between the transistor and a low voltage terminal, a detection unit coupled to the intermediary terminal of the rectification unit so as to receive an operation voltage, a comparison circuit coupled to a first output terminal and a second output terminal of the detection unit, and a logic control circuit coupled to an output terminal of the comparison circuit, a control terminal of the transistor and a control terminal of the switch. The control method includes receiving external alternating-current power by the set of alternating-current power receiver terminals; outputting the operation voltage corresponding to the external alternating-current power by the intermediary terminal of the rectification unit; generating a first detection voltage and a second detection voltage according to the operation voltage by the detection unit; outputting a comparison signal by the comparison circuit when the comparison circuit detects that the first detection voltage is equal to the second detection voltage; and turning on the transistor and the switch so as to discharge a capacitor through the transistor and the switch when the logic control circuit still has not received the comparison signal after a predetermined time interval has elapsed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
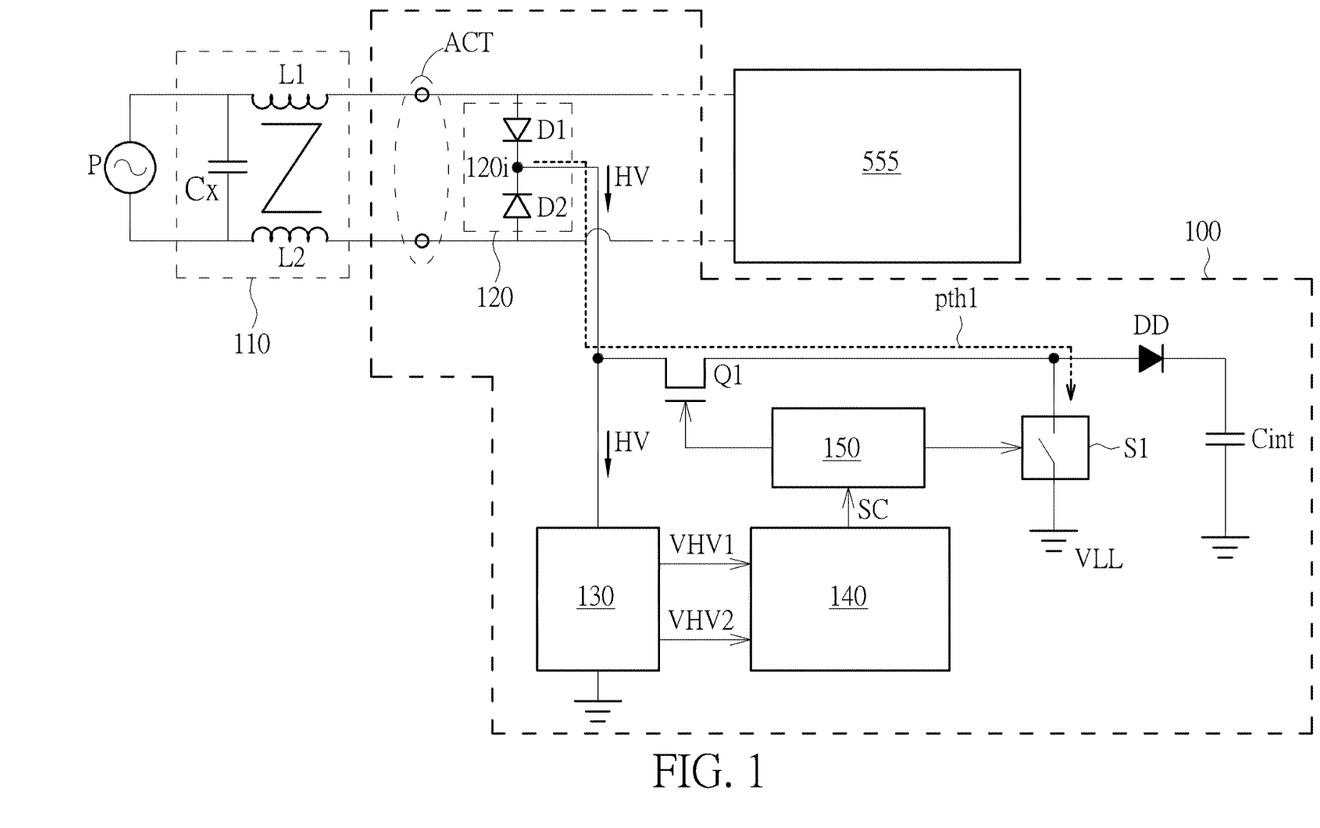
FIG. 1 illustrates an application of a control circuit according to an embodiment.

FIG. 1 illustrates an application of a control circuit 100 according to an embodiment. The control circuit 100 may include a set of alternating-current power receiver terminals ACT, a rectification unit 120, a transistor Q1, a switch S1, a detection unit 130, a comparison circuit 140 and a logic control circuit 150. The set of alternating-current power receiver terminals ACT may be used to receive external alternating-current power P. For example, the set of alternating-current power receiver terminals ACT may be a plug, and the external alternating-current power P may be supplied by mains electricity or a power supply equipment. As shown in FIG. 1, the electromagnetic interference (EMI) filter unit 110 may be coupled between a source of the external alternating-current power P and the set of alternating-current power receiver terminals ACT. The EMI filter unit 110 may be used to perform EMI filtering on external alternating-current power P so as to filter out noise. The rectification unit 120 may include a first terminal, a second terminal and an intermediary terminal 110i. The first terminal and the second terminal of the rectification unit 120 may be coupled to the set of alternating-current power receiver terminals ACT, and the intermediary terminal 110i may be used to output an operation voltage HV corresponding to the external alternating-current power P. The transistor Q1 may include a first terminal coupled to the intermediary terminal 110i of the rectification unit 120, a control terminal, and a second terminal. The switch S1 may include a first terminal coupled to the second terminal of the transistor Q1, a control terminal, and a second terminal coupled to a low voltage terminal VLL. The detection unit 130 may be used to generate a first detection voltage VHV1 and a second detection voltage VHV2 according to the operation voltage HV. The detection unit 130 may include an input terminal coupled to the intermediary terminal 110i of the rectification unit 120, a first output terminal used to output the first detection voltage VHV1, and a second output terminal used to output the second detection voltage VHV2. The comparison circuit 140 may include a first terminal coupled to the first output terminal of the detection unit 130, a second terminal coupled to the second output terminal of the detection unit 130, and an output terminal used to output a comparison signal SC when the first detection voltage VHV1 is equal to the second detection voltage VHV2. The logic control circuit 150 may include an input terminal coupled to the output terminal of the comparison circuit 140, a first output terminal coupled to the control terminal of the transistor Q1, and a second output terminal coupled to the control terminal of the switch S1. The logic control circuit 150 may turn on the transistor Q1 and the switch S1 through the first output terminal and the second output terminal of the logic control circuit 150 when the input terminal of the logic control circuit 150 still has not received the comparison signal SC after a predetermined time interval has elapsed. As shown in FIG. 1, the control circuit 100 may send electric power to a power conversion circuit 555. The power conversion circuit 555 may include (but is not limited to) a bridge rectifier, and a primary coil and a secondary coil of a power transformer. As shown in FIG. 1, the control circuit 100 may further include a diode DD and an initialization capacitor Cint. The diode DD may include an anode coupled the second terminal of the transistor Q1, and a cathode. The control circuit 100 may be implemented in an integrated circuit (IC). The capacitor Cint may be coupled between the cathode of the diode DD and the low voltage terminal VLL for receiving an initial voltage though the transistor Q1 to have the integrated circuit integrating the control circuit 100 start operating. The block diagram of FIG. 1 illustrates a design of the present invention in a modular style, and it is still within the scope of embodiments of the present invention to integrate the rectification unit 120, the transistor Q1, the switch S1, the detection unit 130, the comparison circuit 140, the logic control circuit 150 and/or the diode DD as a gate-level digital circuit using a synthesis process.

According to an embodiment, as shown in FIG. 1, the EMI filter unit 110 may include a capacitor Cx for receiving the external alternating-current power P, and a pair of inductors L1 and L2 coupled to two terminals of the capacitor Cx respectively. The structure is merely for reference and is not for limiting the detailed structure of the EMI filter unit 110.

According to an embodiment, the rectification unit 120 may further include diodes D1 and D2. The diode D1 may include an anode coupled to the first terminal of the rectification unit 120 and a cathode coupled to the intermediary terminal 120i of the rectification unit 120. The diode D2 may include a cathode coupled to the intermediary terminal 120i of the rectification unit 120, and an anode coupled to the second terminal of the rectification unit 120. The structure is merely for reference and is not for limiting the detailed structure of the rectification unit 120. For example, it is still within the scope of embodiments of the present invention to replace the diodes D1 and D2 with diode-connected transistors to form the rectification unit 120.

Figure 2:
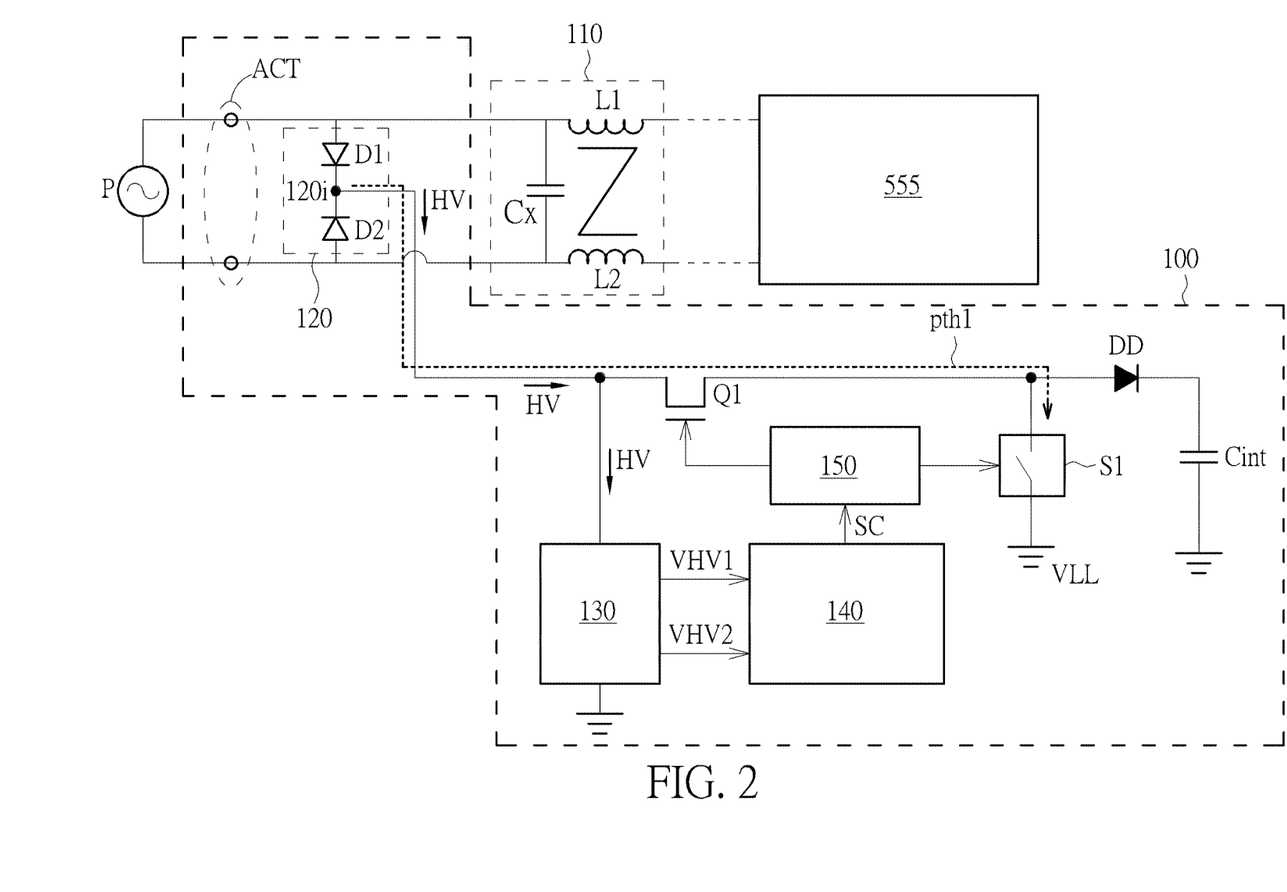
FIG. 2 illustrates another application of the control circuit according to another embodiment.

FIG. 2 illustrates another application of the control circuit 100 according to another embodiment. Unlike FIG. 1, FIG. 2 illustrates that the EMI filter unit 110 may be coupled after the rectification unit 120. In other words, the rectification unit 120 may be coupled between the source of the external alternating-current power P and the EMI filter unit 110. In FIG. 1, the external alternating-current power P is processed by the EMI filter unit 110 to filter out noise before being sent to the terminals of the rectification unit 120. In FIG. 2, the external alternating-current power P is sent to the terminals of the rectification unit 120 before being processed by the EMI filter unit 110 to filter out noise. The control circuit 100 may be applied as FIG. 1 or FIG. 2. The couplings of other portions in FIG. 2 are similar to the couplings of FIG. 1, so it is not described repeatedly.

Figure 3:
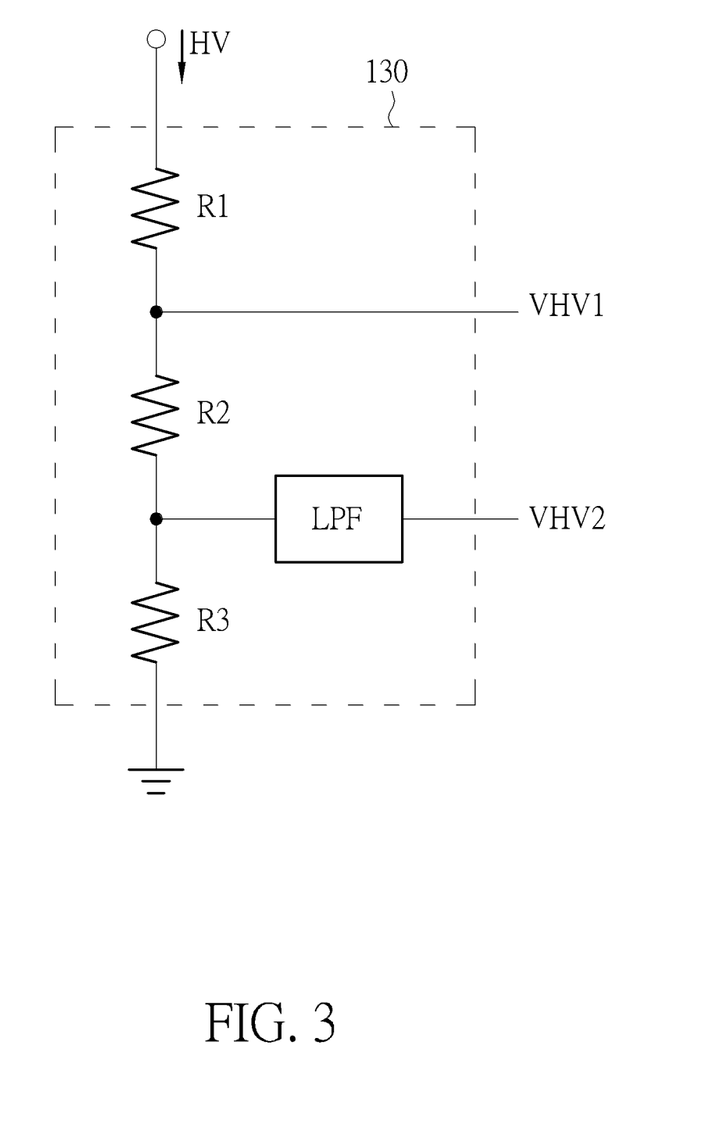
FIG. 3 illustrates a structure of the detection unit according to an embodiment.

FIG. 3 illustrates a structure of the detection unit 130 according to an embodiment. The detection unit 130 may include a first resistor R1, a second resistor R2, a third resistor R3 and a low pass filter LPF. The first resistor R1 may include a first terminal coupled to the input terminal of the detection unit 130 for receiving the operation voltage HV, and a second terminal coupled to the first output terminal of the detection unit 130 for outputting the first detection voltage VHV1. The second resistor R2 may include a first terminal coupled to the second terminal of the first resistor R1, and a second terminal. The third resistor R3 may include a first terminal coupled to the second terminal of the second resistor, and a second terminal coupled to the low voltage terminal VLL or another terminal having a voltage lower than the operation voltage HV. The low pass filter LPF may be coupled between the second terminal of the second resistor R2 and the second output terminal of the detection unit 130 for outputting the second detection voltage VHV2. As shown in FIG. 3, the detection unit 130 may be a voltage dividing unit. The first detection voltage VHV1 may be a divided voltage of the operation voltage HV. The second detection voltage VHV2 may be generated by performing low pass filtering with another divided voltage of the operation voltage HV.

Figure 4:
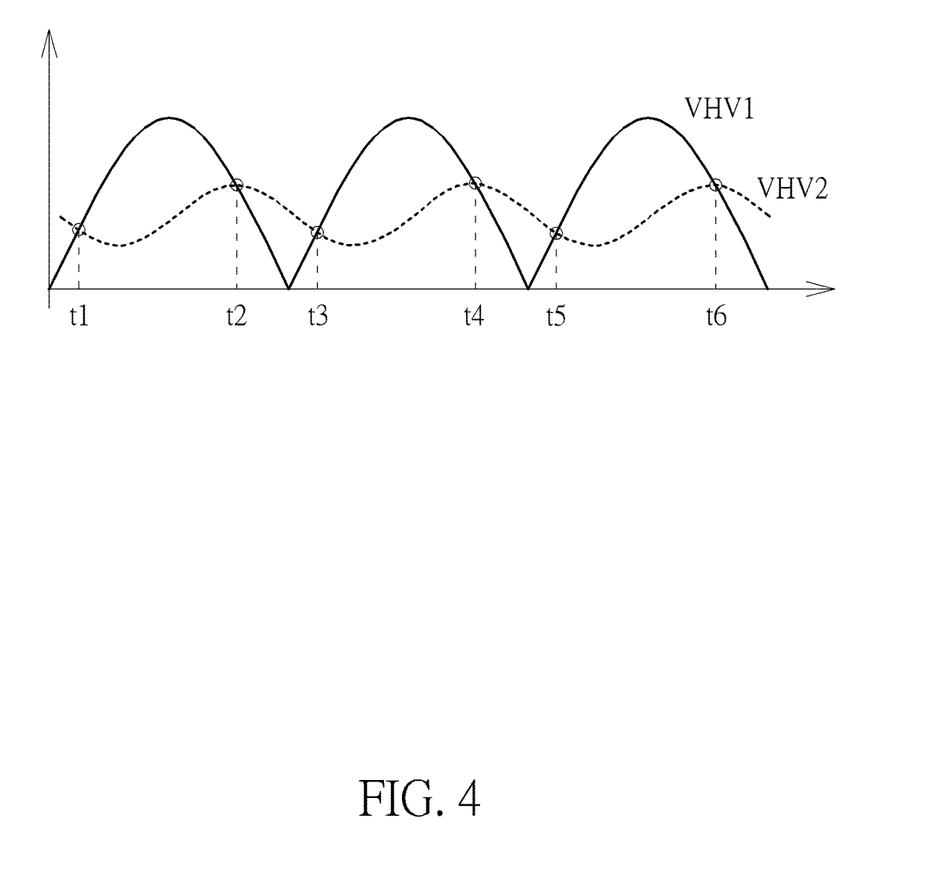
FIG. 4 illustrates waveforms of the first detection voltage and the second detection voltage of FIG. 1 to FIG. 3 when the set of alternating-current power receiver terminals receive the external alternating-current power.
Figure 5:
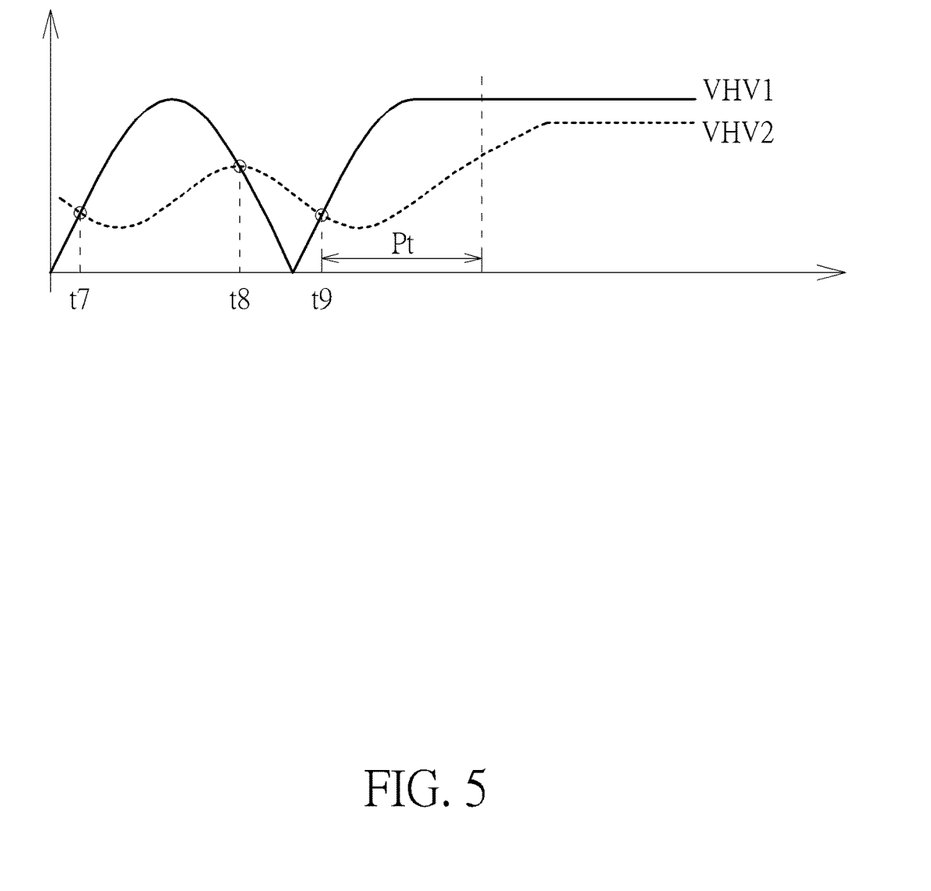
FIG. 5 illustrates waveforms of the first detection voltage and the second detection voltage of FIG. 1 to FIG. 3 when the set of alternating-current power receiver terminals stop receiving the external alternating-current power.

FIG. 4 illustrates waveforms of the first detection voltage VHV1 and the second detection voltage VHV2 of FIG. 1 to FIG. 3 when the set of alternating-current power receiver terminals ACT receive the external alternating-current power P. FIG. 5 illustrates waveforms of the first detection voltage VHV1 and the second detection voltage VHV2 of FIG. 1 to FIG. 3 when the set of alternating-current power receiver terminals ACT stop receiving the external alternating-current power P. Because the second detection voltage VHV2 has been processed by a low pass filter, the waveform of the second detection voltage VHV2 may be more flattened than the waveform of the first detection voltage VHV1. When the set of alternating-current power receiver terminals ACT receive the external alternating-current power P, the first detection voltage VHV1 and the second detection voltage VHV2 may have waveforms of an alternating-current form. The waveforms of the first detection voltage VHV1 and the second detection voltage VHV2 may cross one another. For example, at the time points t1, t2, t3, t4, t5 and t6, the first detection voltage VHV1 may be equal to the second detection voltage VHV2. The comparison circuit 140 may include a comparator and send the comparison signal SC when detecting that the first detection voltage VHV1 is equal to the second detection voltage VHV2.

When the alternating-current power receiver terminals ACT stop receiving the external alternating-current power P, the operation voltage HV may be provided by the charges stored in the capacitor Cx of the EMI filter unit 110 and be of a direct-current form. The waveforms of the first detection voltage VHV1 and the second detection voltage VHV2 may stop crossing one another. As shown in FIG. 5, at time points t7, t8 and t9, the waveforms of the first detection voltage VHV1 and the second detection voltage VHV2 may still cross one another, so it may be determined that the alternating-current power receiver terminals ACT still receive the external alternating-current power P. However, when it has not been observed that the waveforms of the first detection voltage VHV1 and the second detection voltage VHV2 cross one another after a predetermined time interval Pt has elapsed, it may be determined that the alternating-current power receiver terminals ACT have stopped receiving the external alternating-current power P. For example, it may be determined that a plug has been removed from a socket. This condition may be so-called AC off condition.

When the logic control circuit 150 determines that the first detection voltage VHV1 still has been not equal to the second detection voltage VHV2 after the predetermined time interval Pt has elapsed according to the comparison result of the comparison circuit 140, the logic control circuit 150 may turn on the transistor Q1 and the switch S1 for the electric charges stored in the capacitor Cx to be released to the low voltage terminal VLL to meet safety regulations. As shown in FIG. 1, when the alternating-current power receiver terminals ACT receive the external alternating-current power P, no current may flow through the path pth1 substantially because the rectification unit 120 may rectify currents and the switch S1 is turned off. The rectification unit 120 may therefore not consume power. In other words, the problem that power is continuously consumed by a resistor (which is used for releasing charges and decreasing voltage of an EMI filter) may be reduced.

Figure 6:
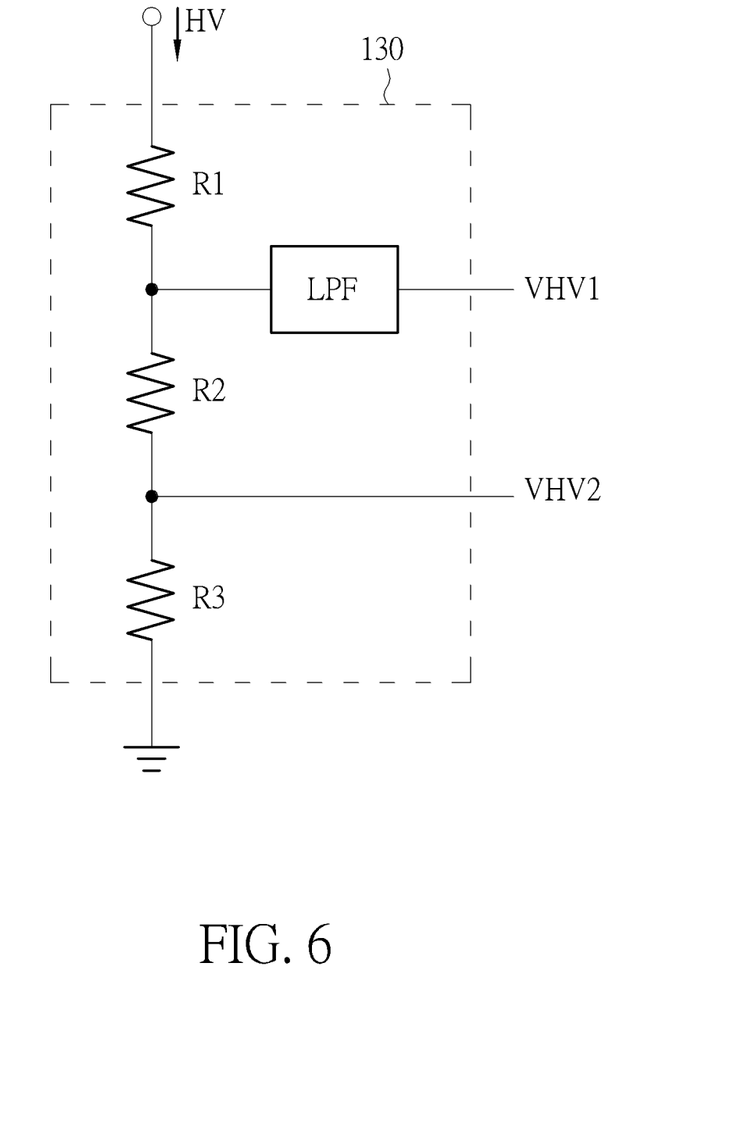
FIG. 6 illustrates a structure of the detection unit according to another embodiment.

FIG. 6 illustrates a structure of the detection unit 130 according to another embodiment. In FIG. 6, the detection unit 130 may include a first resistor R1, a second resistor R2, a third resistor R3 and a low pass filter LPF. Unlike FIG. 3, FIG. 6 illustrates another structure. In FIG. 6, the first resistor R1 includes a first terminal coupled to the input terminal of the detection unit 130 for receiving the operation voltage HV, and a second terminal. The low pass filter LPF is coupled between the second terminal of the first resistor R1 and the first output terminal of the detection unit 130 for outputting the first detection voltage VHV1. The second resistor R2 includes a first terminal coupled to the second terminal of the first resistor R1, and a second terminal. The third resistor R3 includes a first terminal coupled to the second terminal of the second resistor R2 and the second output terminal of the detection unit 130 for outputting the second detection voltage VHV2, and a second terminal.

Figure 7:
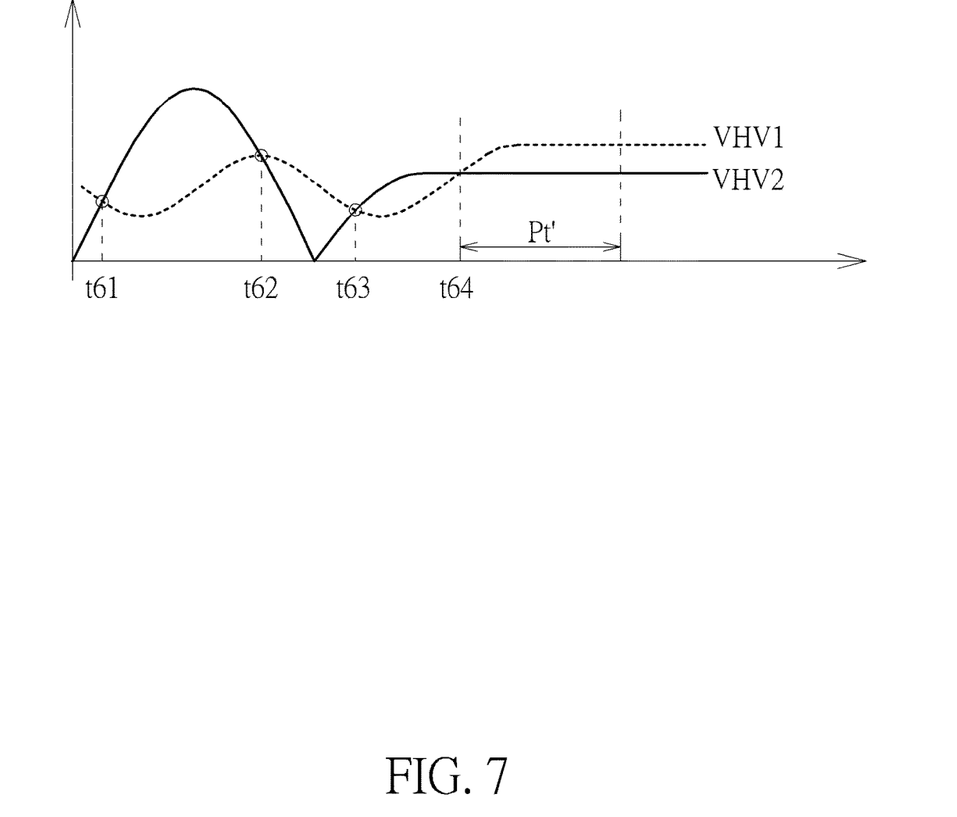
FIG. 7 illustrates waveforms of the first detection voltage and the second detection voltage of FIG. 6 when the set of alternating-current power receiver terminals stop receiving the external alternating-current power.

FIG. 7 illustrates waveforms of the first detection voltage VHV1 and the second detection voltage VHV2 of FIG. 6 when the set of alternating-current power receiver terminals ACT stop receiving the external alternating-current power P. As shown in FIG. 7, the waveforms of the first detection voltage VHV1 and the second detection voltage VHV2 may cross one another at time points t61, t62, t63 and t64. In other words, it may be detected that the first detection voltage VHV1 is equal to the second detection voltage VHV2 at time points t61, t62, t63 and t64. The comparison circuit 140 may send the comparison signal SC at the time points. After time point t64, the waveforms of the of the first detection voltage VHV1 and the second detection voltage VHV2 may become direct-current waveforms without crossing one another because the alternating-current power receiver terminals ACT have stopped receiving the external alternating-current power P. After a predetermined time interval Pt' has elapsed, the logic control unit 150 may turn on the transistor Q1 and the switch S1.

Figure 8:
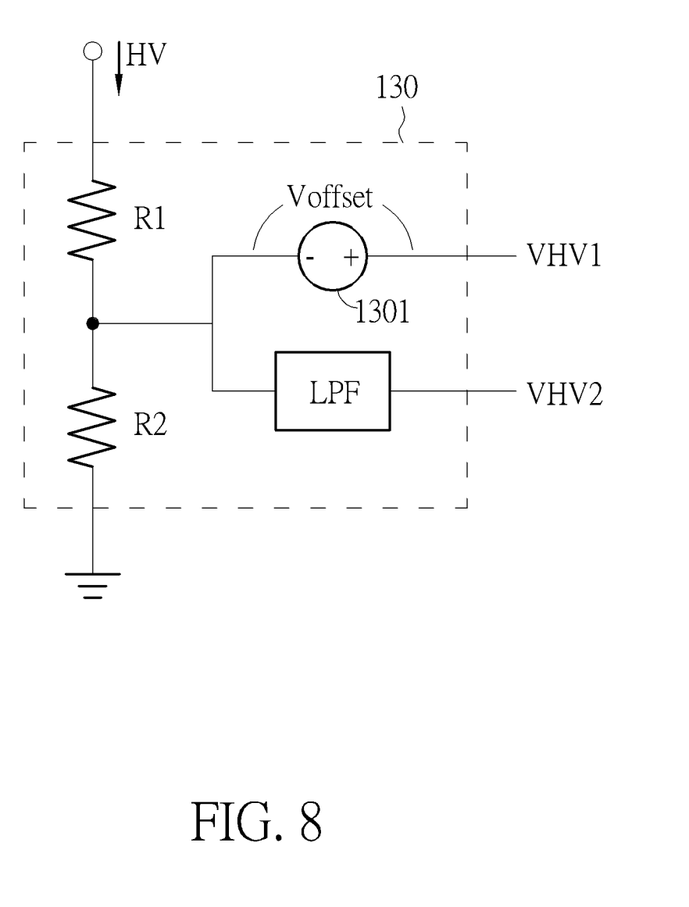
FIG. 8 illustrates the detection according to another embodiment.

FIG. 8 illustrates the detection 130 according to another embodiment. As shown in FIG. 8, the detection unit 130 may include a first resistor R1, a second resistor R2, an off-set voltage source 1301 and a low pass filter LPF. The first resistor R1 may include a first terminal coupled to the input terminal of the detection unit 130 for receiving the operation voltage HV, and a second terminal. The second resistor R2 may include a first terminal coupled to the second terminal of the first resistor R1, and a second terminal. The off-set voltage source 1301 may be used to provide an off-set voltage difference Voffset, and the off-set voltage source 1301 may be coupled between the second terminal of the first resistor R1 and the first output terminal of the detection unit 1301 for outputting the first detection voltage VHV1. The low pass filter LPF may be coupled between the second terminal of the first resistor R1 and the second output terminal of the detection unit 130 for outputting the second detection voltage VHV2. Likewise, when the alternating-current power receiver terminals ACT keep receiving the external alternating-current power P, the waveforms of the first detection voltage VHV1 and the second detection voltage VHV2 may continuously cross one another. After the alternating-current power receiver terminals ACT stop receiving the external alternating-current power P, the waveforms of the first detection voltage VHV1 and the second detection voltage VHV2 may stop crossing one another, and the comparison circuit 140 may stop sending the comparison signal SC to the logic control unit 150. The logic control unit 150 may accordingly turn on the transistor Q1 and the switch S1 so as to discharge a capacitor in an EMI filter unit and decrease a voltage at the capacitor.

Figure 9:
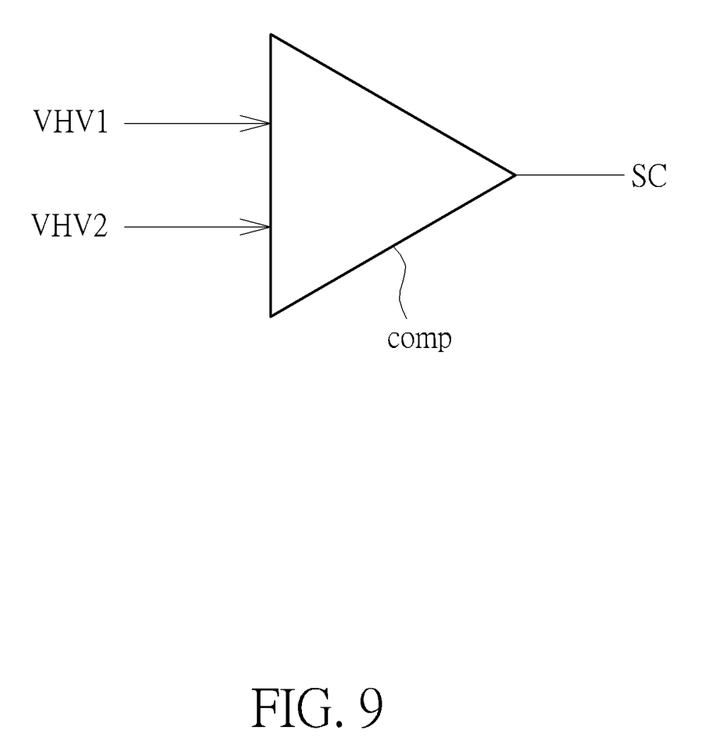
FIG. 9 illustrates a comparator included in the comparison circuit according to an embodiment.

FIG. 9 illustrates a comparator comp included in the comparison circuit 140 according to an embodiment. The comparator comp may include a first input terminal, a second terminal and an output terminal. The first terminal is coupled to the first terminal of the comparison circuit 140 for receiving the first detection voltage VHV1. The second input terminal is coupled to the second terminal of the comparison circuit 140 for receiving the second detection voltage VHV2. The output terminal is coupled to the output terminal of the comparison circuit 140 for outputting the comparison signal SC when the first detection voltage VHV1 increases to the second detection voltage VHV2. For example, at time points t1, t3 and t5 of FIG. 4, the first detection voltage VHV1 increases to the second detection voltage VHV2, and the two waveforms cross one another. According to another embodiment, the output terminal of the comparator comp may output the comparison signal SC when the first detection voltage VHV1 decreases to the second detection voltage VHV2. For example, at time points t2, t4 and t6 of FIG. 4, the first detection voltage VHV1 decreases to the second detection voltage VHV2, and the two waveforms cross one another. According to another embodiment, the signals outputted by the two sorts of comparators described above may be processed using a logic gate (e.g. an OR gate) to generate the comparison signal SC corresponding to the condition of the waveforms of the detection voltages crossing one another.

According to embodiments, the logic control circuit 150 may include a timer for measuring the predetermined time interval. When the logic control circuit 150 still has not received the comparison signal SC after the timer has measured that the predetermined time interval has elapsed, the logic control circuit 150 may turn on the transistor Q1 and the switch S1 to reduce the voltage.

Figure 10:
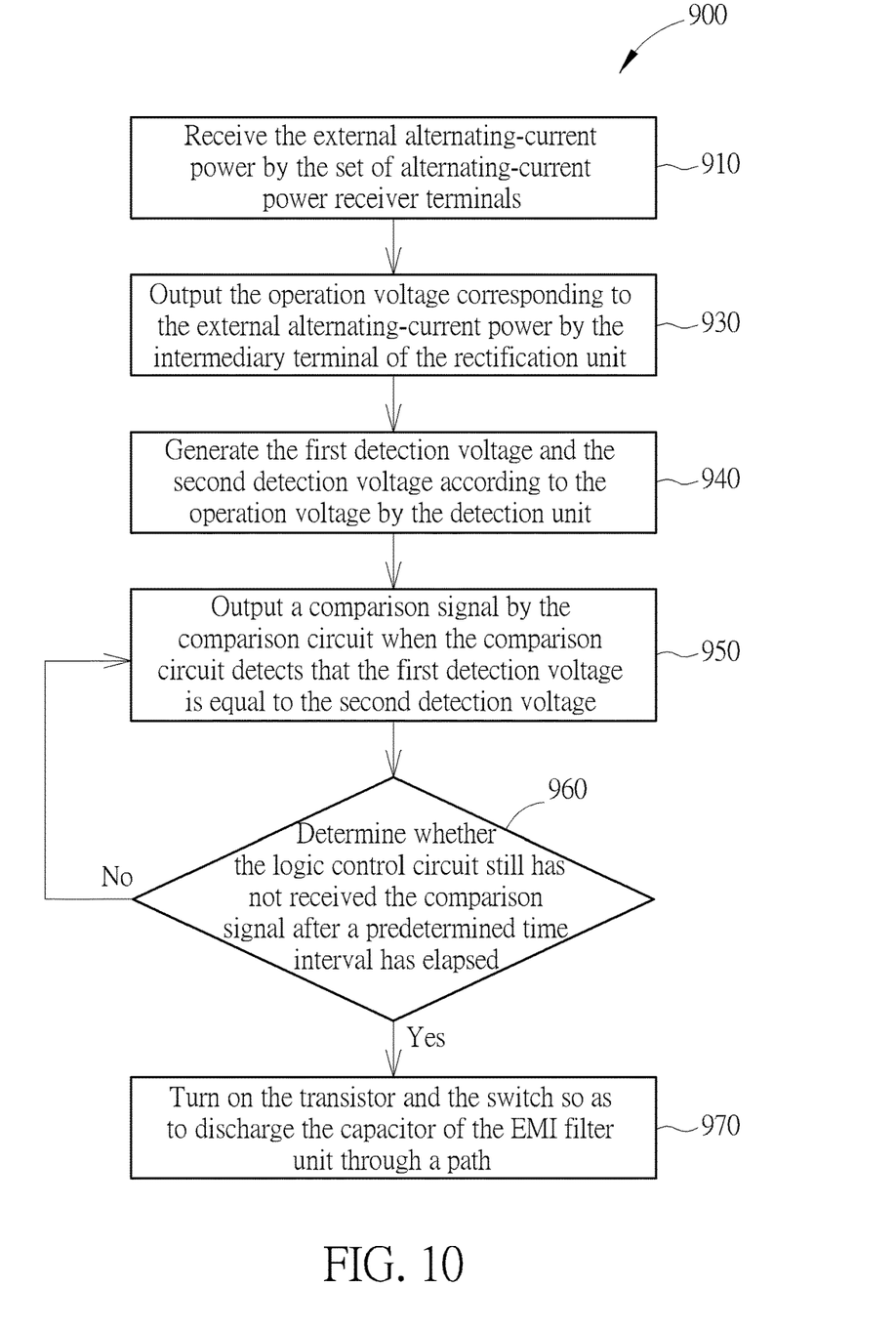
FIG. 10 illustrates a control method for controlling a control circuit according to an embodiment.

FIG. 10 illustrates a control method 900 for controlling a control circuit 100 according to an embodiment. The control method 900 may include the following steps.

Step 910: receive the external alternating-current power P by the set of alternating-current power receiver terminals ACT;

Step 930: output the operation voltage HV corresponding to the external alternating-current power P by the intermediary terminal 120i of the rectification unit 120;

Step 940: generate the first detection voltage VHV1 and the second detection voltage VHV2 according to the operation voltage HV by the detection unit 140;

Step 950: output a comparison signal SC by the comparison circuit 140 when the comparison circuit 140 detects that the first detection voltage VHV1 is equal to the second detection voltage VHV2;

Step 960: determine whether the logic control circuit 150 still has not received the comparison signal SC after a predetermined time interval has elapsed; if so, enter Step 970; else enter Step 950; and Step 970: turn on the transistor Q1 and the switch S1 so as to discharge the capacitor Cx of the EMI filter unit 110 through the path pth1.

As mentioned above, in Step 950, the comparison signal SC may be generated when the first detection voltage VHV1 increases and/or decreases to the second detection voltage VHV2.

In summary, by means of a control circuit and a control method according to an embodiment, the status of receiving alternative-current power may be detected when the alternative-current power is stopped being supplied. A transistor and a switch may be turned on accordingly to decrease a high voltage and comply with safety regulations. In addition, unnecessary power consumption may be reduced. Therefore, it is beneficial for safety, power saving, and overcoming the shortcomings of prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit comprising:
a set of alternating-current power receiver terminals configured to receive external alternating-current power;
a rectification unit comprising a first terminal, a second terminal and an intermediary terminal wherein the first terminal and the second terminal of the rectification unit are coupled to the set of alternating-current power receiver terminals, and the intermediary terminal is configured to output an operation voltage corresponding to the external alternating-current power;
a transistor comprising a first terminal coupled to the intermediary terminal of the rectification unit, a control terminal, and a second terminal;
a switch comprising a first terminal coupled to the second terminal of the transistor, a control terminal, and a second terminal coupled to a low voltage terminal;
a detection unit configured to generate a first detection voltage and a second detection voltage according to the operation voltage, and comprising an input terminal coupled to the intermediary terminal of the rectification unit, a first output terminal configured to output the first detection voltage, and a second output terminal configured to output the second detection voltage;
a comparison circuit comprising a first terminal coupled to the first output terminal of the detection unit, a second terminal coupled to the second output terminal of the detection unit, and an output terminal configured to output a comparison signal when the first detection voltage is equal to the second detection voltage; and
a logic control circuit comprising an input terminal coupled to the output terminal of the comparison circuit, a first output terminal coupled to the control terminal of the transistor, and a second output terminal coupled to the control terminal of the switch wherein the logic control circuit turns on the transistor and the switch through the first output terminal and the second output terminal of the logic control circuit when the input terminal of the logic control circuit still has not received the comparison signal after a predetermined time interval has elapsed.

2. The control circuit of claim 1, wherein the rectification unit further comprises:
a first diode comprising an anode coupled to the first terminal of the rectification unit, and a cathode coupled to the intermediary terminal of the rectification unit; and
a second diode comprising a cathode coupled to the intermediary terminal of the rectification unit, and an anode coupled to the second terminal of the rectification unit.

3. The control circuit of claim 1, wherein the detection unit further comprises:
- a first resistor comprising a first terminal coupled to the input terminal of the detection unit, and a second terminal coupled to the first output terminal of the detection unit;
- a second resistor comprising a first terminal coupled to the second terminal of the first resistor, and a second terminal;
- a third resistor comprising a first terminal coupled to the second terminal of the second resistor, and a second terminal; and
- a low pass filter coupled between the second terminal of the second resistor and the second output terminal of the detection unit.

4. The control circuit of claim 1, wherein the detection unit further comprises:
- a first resistor comprising a first terminal coupled to the input terminal of the detection unit, and a second terminal;
- a low pass filter coupled between the second terminal of the first resistor and the first output terminal of the detection unit;
- a second resistor comprising a first terminal coupled to the second terminal of the first resistor, and a second terminal; and
- a third resistor comprising a first terminal coupled to the second terminal of the second resistor and the second output terminal of the detection unit, and a second terminal.

5. The control circuit of claim 1, wherein the detection unit further comprises:
- a first resistor comprising a first terminal coupled to the input terminal of the detection unit, and a second terminal;
- a second resistor comprising a first terminal coupled to the second terminal of the first resistor, and a second terminal;
- an off-set voltage source configured to provide an off-set voltage difference, and coupled between the second terminal of the first resistor and the first output terminal of the detection unit; and
- a low pass filter coupled between the second terminal of the first resistor and the second output terminal of the detection unit.

6. The control circuit of claim 1, wherein the comparison circuit comprises a comparator, and the comparator comprises:
- a first input terminal coupled to the first terminal of the comparison circuit;
- a second input terminal coupled to the second terminal of the comparison circuit; and
- an output terminal coupled to the output terminal of the comparison circuit and configured to output the comparison signal when the first detection voltage increases to the second detection voltage.

7. The control circuit of claim 1, wherein the comparison circuit comprises a comparator, and the comparator comprises:
- a first input terminal coupled to the first terminal of the comparison circuit;
- a second input terminal coupled to the second terminal of the comparison circuit; and
- an output terminal coupled to the output terminal of the comparison circuit and configured to output the comparison signal when the first detection voltage decreases to the second detection voltage.

8. The control circuit of claim 1, wherein the logic control circuit further comprises a timer configured to measure the predetermined time interval.

9. The control circuit of claim 1, further comprising:
- a diode comprising an anode coupled the second terminal of the transistor, and a cathode; and
- a capacitor coupled between the cathode of the diode and the low voltage terminal.

10. A control method for controlling a circuit, the circuit comprising a set of alternating-current power receiver terminals, a rectification unit coupled to the set of alternating-current power receiver terminals, a transistor coupled an intermediary terminal of the rectification unit, a switch coupled between the transistor and a low voltage terminal, a detection unit coupled to the intermediary terminal of the rectification unit so as to receive an operation voltage, a comparison circuit coupled to a first output terminal and a second output terminal of the detection unit, and a logic control circuit coupled to an output terminal of the comparison circuit, a control terminal of the transistor and a control terminal of the switch, the control method comprising:
- receiving external alternating-current power by the set of alternating-current power receiver terminals;
- outputting the operation voltage corresponding to the external alternating-current power by the intermediary terminal of the rectification unit;
- generating a first detection voltage and a second detection voltage according to the operation voltage by the detection unit;
- outputting a comparison signal by the comparison circuit when the comparison circuit detects that the first detection voltage is equal to the second detection voltage; and
- turning on the transistor and the switch so as to discharge a capacitor through the transistor and the switch when the logic control circuit still has not received the comparison signal after a predetermined time interval has elapsed.

* * * * *